Patented Jan. 24, 1950

2,495,489

UNITED STATES PATENT OFFICE 2,495,489

PREPARATION OF N-HALO DERIVATIVES OF ORGANIC SULFONAMIDES

Eleonoor Eduard van Andel, Amsterdam, Netherlands, assignor to Shell Development Company, San Francisco, Calif., a corporation of Delaware No Drawing. Application July 30, 1947, Serial No. 764,919. In the Netherlands March 25, 1941

Section 1, Public Law 690, August 8, 1946
Patent expires March 25, 1961

2 Claims. (Cl. 260—556)

This invention relates to an improved method of preparing N-halo derivatives of organic sulfonamides. More particularly the present invention relates to a novel method of replacing with halogen atoms all of the hydrogen atoms attached to the amido nitrogen atoms of organic sulfonamides containing at least one hydrogen atom so attached. In its most specific embodiment, the invention provides a novel process for the production of aromatic dichlorosulfonamides such as dichloramine T, by chlorinating in a single operation which may be conducted at room temperature and under atmospheric pressure, an aromatic hydrocarbon sulfonamide dissolved in an aqueous alkaline reaction medium.

The N-chloro derivatives of organic sulfonamides, particularly those of the aryl sulfonamides are valuable general bleaching and disinfecting agents. Certain of these commercially valuable sulfochloramides can be prepared in practically theoretical amounts by an economical process comprising introducing chlorine under normal conditions of pressure and temperature into an aqueous alkaline solution containing the corresponding aromatic sulfonamides. Sulfonamides containing more than about five carbon atoms per molecule, including the N-substituted sulfonamides are often completely insoluble in neutral or acidic water solutions, but sulfonamides differ from the amides of the carboxylic acids by being sufficiently acidic in character to react with and become soluble in aqueous solutions containing alkali metal hydroxides. In this manner an aqueous solution of p-toluenesulfonamide may be prepared by causing the sulfonamide to react with at least an equimolar portion of a soluble metal hydroxide. Upon the addition of gaseous chlorine to such a solution containing of p-toluenesulfonamide one of the hydrogen atoms originally attached to the amido nitrogen atom is replaced by a chlorine atom producing p-toluenesulfochloramide (chloramin T). The N-dichloro derivative (dichloramine T) exhibits a markedly greater activity, particularly as a bleaching agent, but its production has heretofore required much more rigorous reaction conditions. Unless the pH of the reaction medium approaches neutrality or even acidity, further halo-substitution of the hydrogen atoms initially attached to the amide nitrogen atom cannot occur. In the case of many aliphatic or alicyclic sulfonamides their properties of water solubility are such that the addition of a gaseous free halogen to an aqueous solution or suspension containing them is productive of good conversions to the desired product at normal temperatures. Even the more insoluble members of the aliphatic or alicyclic sulfonamides are usually sufficiently soluble to be similarly completely N-halo-substituted by first dissolving them in the form of their salts and allowing the pH of the reaction medium to approach acidity during the substitution reaction. The aromatic sulfonamides and the more nearly completely water insoluble sulfonamides in general, when treated in the same manner become so insoluble in the reaction medium that an N-halo-substitution reaction at room temperature becomes inoperatively slow after the replacement of a single hydrogen atom. The formation of N-dihalo derivatives by the treatment of aromatic sulfonamides with free halogen in aqueous media has heretofore required the employment of extremely large volumes of water and/or relatively high reaction temperatures and pressures. For example, the N-dichloro derivatives of aromatic sulfonamides can be prepared by the addition of chlorine to a suspension of the sulfonamide in water, but large volumes of solvent are required and in order to obtain practical conversions the resulting suspensions must be heated to temperatures generally above about 60° C., requiring considerable expense and the handling of bulky quantities of excess reactants. N-dichloro aromatic sulfonamides have also been prepared by dissolving in water the soluble salts of the monochloro derivatives, and causing their subsequent conversion to the dichloro derivative by the controlled addition of an acid to the aqueous solution. However, when the conversion of the monochloro compound is initiated by a treatment with an acid such as acetic acid or hydrochloric acid, the original unsubstituted sulfonamide is produced in equal molar quantities with the desired dihalo derivative in accordance with a reaction equation such as is illustrated for the preparation of p-toluenesulfodichloramide from sodium p-toluenesulfomonochloramide:

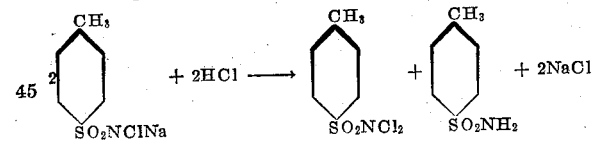

In addition to requiring the separation of structurally similar components from the reaction mixture, such a process requires two moles of the starting compound to produce one mole of the desired product, and since an excess of the acid is usually employed to be sure of obtaining a complete conversion, the dichlorosulfonamides so produced almost inevitably adsorb traces of inorganic acids from the acidic reaction mixture.

The adsorbed or occluded acids cannot be entirely removed without extensive purification procedures, and their presence catalytically accelerates the decomposition of the sulfodichloramides. By employing carbonic acid in conjunction with sodium hypochlorite or free chlorine, either the sulfonamides or the monochlorosulfonamides can be converted to the dichlorocompounds without the formation of the unsubstituted sulfonamide and without the adsorption or occlusion of inorganic acids in the separated sulfodichloramides. However, carbonic acid cannot exist in aqueous solution under normal conditions in the quantities required for the reaction, and the employment of carbonic acid therefore requires the use of special apparatus and high reaction pressures, which are usually above about twenty atmospheres.

An important object of the present invention is to provide a practical process whereby dichloramine T can be economically produced in a single operation by chlorinating p-toluenesulfonamides in an aqueous solution at room temperature and under normal atmospheric pressure. Another object of the invention is to provide a method of preparing the N-dihalo derivatives of normally water insoluble organic sulfonamides, which are soluble in aqueous media only as their alkali metal salts, without the necessary presence of free acids or acid anhydrides in the reaction medium. Another object of the invention is to provide a method of converting difficultly soluble organic sulfonamides to their N-dihalo derivatives in practically quantitative amounts by a reaction process which produces but one organic reaction product. A further object of the invention is to provide a method of replacing with halogen atoms all of the hydrogen atoms attached to the amido nitrogen atoms of organic sulfonamides by an economical reaction process which is not essentially dependent upon the solubility of the free sulfonamide in water, and which does not require a large molar excess of any reactant. Still other objects and advantages will be apparent from the following description and illustration of the process.

It has now been discovered that contrary to the prior beliefs, an aromatic sulfonamide dissolved in water by sufficient alkali metal hydroxide to form the salt of the sulfonamide can be directly converted to the N-dihalo derivative by the addition of free halogen without the necessary employment of an elevated reaction temperature or superatmospheric pressure when the reaction is conducted in the presence of a salt of a strong base and a weak acid in amounts sufficient to neutralize the hydrogen halide liberated by the substitution reaction, thus maintaining the pH of the reaction medium at not less than about 7 during the halo-substitution reaction. Substituted aromatic sulfonamides containing at least one amido hydrogen atom, even sulfonamides substantially water insoluble as the free sulfonamide, can in this manner be further halogenated so that all of the hydrogen atoms attached to the amido nitrogen atoms are replaced by halogen atoms without the necessary employment of rigorous reaction conditions. The present invention may be generally stated as providing a process for the replacement with halogen atoms of all of the hydrogen atoms attached to the nitrogen atoms of organic sulfonamides containing at least one hydrogen atom so attached, which process comprises treating the organic sulfonamide with a free halogen in a aqueous reaction medium containing sufficient alkali metal hydroxide to form the salt of the sulfonamide, and containing a salt of a strong base and a weak acid, preferably an alkali metal carbonate, in an amount sufficient to neutralize the hydrogen halide formed by the substitution reaction.

While any organic sulfonamide containing one or more hydrogen atom attached to the amido nitrogen atom can be converted by the present process into N-halo derivatives in which all of the hydrogen atoms attached to the amido nitrogen atom are replaced by halogen atoms, the process provides its greatest advantages in the halo-substitution of the difficultly soluble sulfonamides such as the aromatic sulfonamides, and particularly in the preparation of the dichloro derivatives of aromatic hydrocarbon sulfonamides such as dichloramine T, which have proved to be highly valuable compounds for commercial application.

Suitable sulfonamide starting materials for the preparation of N-halo-sulfonamides in accordance with the present process therefore comprise mono or polynuclear aromatic sulfonamides containing one or more sulfonamide groups, (preferably unsubstituted sulfonamide groups) as well as similar aromatic sulfonamides containing one or a plurality of nuclear substituent groups or radicals which are sufficiently small or unreactive as to allow the retention of the characteristic sulfonamide properties of the compound. Substituent groups which in addition to one or more sulfonamide groups may suitably be attached to the nucleus of the aromatic compounds to be halogenated by the process of the invention, include alkyl radicals, halogen atoms, carboxy, hydroxy, amino, ether, and the like groups which are unreactive to free halogen at room temperature and pressure. Representative examples of individual organic sulfonamides which may suitably be employed as the starting compounds for the present process include, benzenesulfonamides, toluenesulfonamides, xylenesulfonamides, naphthalene sulfonamides, N-methyl toluenesulfonamides, N-propyl benzenesulfonamides, N-butyl benzenesulfonamides, N-pentyl cyclohexylsulfonamides, pentylcyclohexanesulfonamides, chlorotoluenesulfonamides, bromobenzenesulfonamides, methoxybenzenesulfonamides, ethoxytoluenesulfonamides, benzenedisulfonamides, toluenedisulfonamides, naphthalenedisulfonamides, methoxybenzylmethanesulfonamides, naphthalenedisulfonamides, methoxyphenylmethanesulfonamides, phenolsulfonamides, cresolsulfonamides, naphthosulfonamides, N-cyclohexylbenzenesulfonamides, carboxybenzenesulfonamides, carboxytoluenesulfonamides, carboxynaphthalenesulfonamides, aminobenzenesulfonamides, aminotoluenesulfonamides, aminonaphthalenesulfonamides, and the like.

The production of N-dihalosulfonamides for employment as bleaching and disinfecting materials is best accomplished by chlorinating sulfonamides of alkyl substituted or unsubstituted aromatic hydrocarbons containing one or more unsubstituted sulfonamide groups. The sulfonamides of aromatic hydrocarbons therefore form a particularly preferred subclass of starting compounds and include such representative compounds as: toluenesulfonamides, xylenesulfonamides, trimethylbenzenesulfonamides, diethylbenzenesulfonamides, triethylbenzenesulfonamides, propylbenzenesulfonamides, phenylethanesulfonamides, phenylpropanesulfonamides, phenylpentanesulfonamides, pentylbenzenesulfonamides, cyclobutylbenzenesulfonamides, cyclopentylbenzenesulfonamides, cyclohexylbenzenesulfonamides, isopropylbenzenesulfonamides, isobutylbenzenesulfonamides, isopentylbenzenesulfonamides, pentamethylbenzenesulfonamides, methylcyclohexylbenzenesulfonamides, isopropylcyclobutylbenzenesulfonamides, ethylcyclopentylbenzenesulfonamides, naphthalenesulfonamides, tetrahydronaphthalenesulfonamides, indenesulfonamides, phenanthrenesulfonamides, and the like.

The halogenation of organic sulfonamides in accordance with the process of the invention may be suitably accomplished by introducing, or generating in situ, one or more of the elements fluorine, chlorine, bromine or iodine, preferably in the normally gaseous elements, in the aqueous solution containing the sulfonamide. It is preferred to add the free halogen in the gaseous state. Chlorine, because it rapidly replaces all of the amido hydrogen atoms at room temperature and normal pressure and because of the valuable properties of the N-chloro derivatives of the organic sulfonamides, is the most particularly preferred free halogen for employment in the present process.

The treatment of the organic sulfonamides may be accomplished in any apparatus suitable for the dispersion of a free halogen throughout a liquid reaction medium. In general, the addition of the free halogen is best accomplished by the introduction of its vapors at room temperature under normal atmospheric pressure; however, many variations of the reaction conditions may suitably be employed, such as the employment of elevated temperatures, pressures, the physical form of free halogen, the generation of the halogen in situ by the reaction of suitable materials within the reaction medium, or similar variations. The reaction temperatures may range from the freezing to the boiling point of the aqueous reaction medium, and the reaction pressures may be substantially above or below normal atmospheric pressure; however, since the process is productive of practically theoretical returns of the desired products at normal conditions of pressure and temperature, i. e., under normal atmospheric pressure and at temperatures between about 15° C. to about 30° C., these "normal conditions" form the preferred and the most advantageous reaction conditions to be employed in conducting the process of the present invention.

The process may be conducted in a continuous or in a batchwise manner, and the initial reactants may be introduced in the pure state or as the primary components of mixtures. The reaction may be conducted in the presence of suitable solvents or diluents, such as those alcohols, ethers and the like which are substantially unreactive to halogen at normal temperatures. Such solvents or diluents are preferably those which are sufficiently ionic to be completely miscible with water solutions containing inorganic materials in solution. In any case, however, the solvents or diluents should not be present in sufficient amounts to prevent the solution of about the stoichiometric equivalent amounts of both the inorganic hydroxides and carbonates.

Any soluble inorganic hydroxide which in water solutions exhibits a pH in the range of that exhibited by solutions of about the same concentration of alkali metal hydroxides is suitable for the present process. However, it is generally cheaper, and it is preferred to employing the alkali metal hydroxides such as lithium hydroxide, sodium hydroxide, potassium hydroxide, or cesium hydroxide, either singly or as mixtures of one or more hydroxides in amounts of about the stoichiometric amount required to form the sodium salt of the sulfonamide employed. Although the amount of the hydroxides employed is not critical, the optimum conversions and the greatest ease of separating the reaction products result from the employment of the alkali metal hydroxide in substantially molar equivalent amounts with the sulfonamide to be halo-substituted.

The alkali metal carbonates have beeen found to be particularly effective substances for employment as the salt of a strong base and a weak acid to neutralize the hydrogen halide liberated by the halo-substitution reaction of the present process. However, any such salt having in water solutions a pH in the range of that of the alkali metal carbonates, which may be either the neutral or acid carbonates, may be suitably employed in the present process. The employment of carbonates is particularly advantageous in that the presence of un-neutralized hydrogen halide may readily be detected, when the reaction is conducted at atmospheric pressure, by the evolution of carbon dioxide. Illustrative of the particularly preferred salts of a strong base and a weak acid for employment in the present process include, lithium carbonate, lithium bicarbonate, sodium carbonate, sodium bicarbonate, potassium carbonate, potassium bicarbonate, cesium carbonate and cesium bicarbonate.

The amount of water required to form a sufficiently homogeneous reaction medium and the molar proportions of the reactants may suitably be varied, but the extent to which such variations may be made without adversely affecting the yield of the desired product will in each particular case depend on several factors, such as: the particular sulfonamide employed, the free halogen employed and the method of its introduction into the reaction medium, the reaction temperature and pressure employed, and to a certain extent upon the time of treatment and numerous other considerations such as the method to be employed in the separation of the reaction mixture. It has been found that particularly high conversions are obtained when an aromatic sulfonamide, an alkali metal hydroxide and an alkali metal carbonate in molar proportions of 2:2:1 are dissolved in sufficient water to form a substantially homogeneous solution at room temperature and treated with about four molar portions of chlorine. In this manner the chlorination reaction proceeds directly to the formation of the insoluble dichlorosulfonamide, the unconverted sulfonamide remains dissolved as the ion of its soluble salt, the hydrochloric acid formed by the chlorination reaction is neutralized to form sodium chloride and a rapid conversion of substantially all of the sulfonamide to the desired product is obtained at room temperature under atmospheric pressure in about the time required to introduce and disperse the chlorine in the reaction medium.

The rate at which the free halogen may be suitably introduced will, of course, be dependent upon the concentration of the reaction medium, the reaction temperature, the efficiency of the dispersion of the free halogen throughout the reaction medium, and the like. It has been found that in the halogenation with gaseous chlorine of an aromatic sulfonamide dissolved in about fourteen parts of water, thus forming a substantially homogeneous solution, the reaction will readily utilize about two parts by weight of chlorine per hour and is productive of practically theoretical conversions of the sulfonamide in a total reaction time of about four and one-half hours. In any case the maximum rate of addition of the halogen can readily be determined by occurrence of a change of color of the reaction medium accompanied by a rapid evolution of carbon dioxide when the introduction of the free halogen becomes more rapid than its utilization. In the case of preparing dichloramine T from p-toluenesulfonamide, to obtain a homogeneous solution, the reaction medium should contain not more than about 7.5 parts by weight of the sulfonamide per 100 parts by weight of water when the reaction is to be conducted at about room temperature. To prepare dichloramine T in accordance with the particularly preferred mode of operation the reactants should be combined in substantially the proportions indicated by the following equation, the suitable variations necessary for the employment of equivalent hydroxides and/or carbonates such as the bicarbonates will readily be apparent to those skilled in the art:

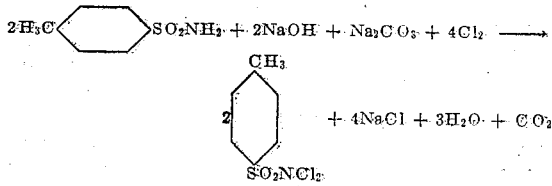

When the reactants are combined in proportions equivalent to those indicated, the dichloro derivative is practically insoluble in the resulting inorganic reaction mixture and may be readily removed by filtering, centrifuging or by merely allowing the aqueous mixture to stand and subsequently decanting off the aqueous solution. In addition, the product so obtained may easily be purified by simply washing with cold water. Since the reaction mixture contains no inorganic acids or free halogen, the products are entirely freed of the reaction mixture by a simple washing and have a greater stability than it was heretofore possible to attain without the employment of high pressures during the halogenation reaction. When a relatively pure p-toluenesulfonamide is employed for the starting compound, the dichloro derivative produced by the process of the invention is obtained in the form of substantially colorless crystals without the necessity of recrystallization.

The employment of o-toluenesulfonamide as the starting compound results in the production of the dichloro derivatives in the form of an oily liquid and when the starting materials comprise a mixture of ortho and para-toluenesulfonamides, dichloro derivatives varying from pasty solids to oily liquids in character are obtained. It is therefore possible by the present process to prepare highly effective bleaching and disinfecting agents having various physical characteristics as desired for particular uses.

The following example illustrates the preparation of p-toluenesulfodichloroamide from p-toluenesulfonamide in accordance with the particularly preferred mode of operation of the present process, however; the invention is not limited to the materials and reaction conditions described, since numerous variations of materials and conditions may be suitably employed.

A homogeneous water solution was prepared by dissolving 2.7 kg. of sodium hydroxide, 3.6 kg. of anhydrous sodium carbonate and 11.5 kg. of p-toluenesulfonamide in 150 kg. of water at normal room temperature. While the solution was thoroughly stirred gaseous chlorine was introduced at the rate of 2 kg. per hour. As the chlorine was introduced into the reaction medium a suspension of a white solid was formed in the aqueous solution and gaseous carbon dioxide was evolved. The reaction was complete when 9.6 kg. of chlorine had been introduced. Shortly before the addition of the gas was completed the suspended precipitate agglomerated, settled to the bottom of the reactor.

The precipitate was removed by filtration, washed with a small portion of water and dried at 50–60° C. in the open air. The crystalline precipitate so obtained weighed 15.7 kg. and by chemical analysis was determined to be p-toluenesulfodichloramide having a chlorine content of 29.0% corresponding to an active oxygen equivalent of 13.1%. The yield therefore amounted to 95% of the amount of pure p-toluenesulfodichloramide possible to obtain from the amount of p-toluenesulfonamide employed. The active chlorine content of the reaction medium was found to be less than 0.02%.

I claim as my invention:

1. In a process for converting para-toluene sulfonamide in an aqueous alkaline medium, to the N,N-dichlorosulfonamide, the improvement which comprises, dissolving the sulfonamide, sodium hydroxide and sodium carbonate in molar proportions of substantially 1:1:0.5 in sufficient water to form a substantially homogeneous solution, and introducing into the solution, at about room temperature under atmospheric pressure, substantially 2 moles of chlorine per mole of sulfonamide.

2. In a process for converting a monosulfonamide of an aryl hydrocarbon containing from 6 to 10 carbon atoms and having not more than one benzene ring in the molecule, in an aqueous alkaline medium to the corresponding N,N-dichlorosulfonamide, the improvement which comprises, dissolving the sulfonamide, an alkali metal hydroxide and an alkali metal carbonate in molar proportions (based upon dibasic carbonate) of substantially 1:1:0.5 in sufficient water to form a homogeneous solution, and introducing into the solution, at about room temperature under atmospheric pressure, 2 moles of chlorine per mole of sulfonamide.

ELEONOOR EDUARD VAN ANDEL.

REFERENCES CITED

The following references are of record in the file of this patent:

UNITED STATES PATENTS

| Number | Name | Date |
|---|---|---|
| 1,944,568 | Mirau | Jan. 23, 1934 |
| 2,111,913 | Kamlet | Mar. 22, 1938 |
| 2,394,902 | Engelmann | Feb. 12, 1946 |

OTHER REFERENCES

Kastle, "Am. Chem. Journal," vol. 17 (1895), pp. 704 to 708.

Kastle et al., "Am. Chem. Journal," vol. 18 (1896), pp. 492 to 494.

Dakin, "J. Am. Med. Assoc.," vol. 69 (1917), p. 30.

Krauss, "Am. J. Pharm.," vol. 90 (1918), page 17.